June 14, 1960 YASUSHI HOSHINO ET AL 2,940,763

METHOD FOR SETTING A MAGNETIC SOUND RECORD SHEET ON A MAGNETIC SOUND RECORD READING MACHINE AND AN APPARATUS THEREFOR

Filed Oct. 23, 1957

3 Sheets-Sheet 1

June 14, 1960 YASUSHI HOSHINO ET AL 2,940,763

METHOD FOR SETTING A MAGNETIC SOUND RECORD SHEET ON A MAGNETIC SOUND RECORD READING MACHINE AND AN APPARATUS THEREFOR

Filed Oct. 23, 1957

3 Sheets-Sheet 3

United States Patent Office 2,940,763

Patented June 14, 1960

2,940,763

METHOD FOR SETTING A MAGNETIC SOUND RECORD SHEET ON A MAGNETIC SOUND RECORD READING MACHINE AND AN APPARATUS THEREFOR

Yasushi Hoshino, 462 1-chome, Tamagawa-Okusawacho, Setagaya-ku; Minoru Sato, 635 Ishikawacho Apt., Ishikawa-cho, Ota-ku; and Mamoru Namikawa, 664 Kugahara-cho, Ota-ku, all of Tokyo, Japan Filed Oct. 23, 1957, Ser. No. 691,979

Claims priority, application Japan Oct. 23, 1956

5 Claims. (Cl. 274—4)

This invention relates to apparatus for setting a magnetic sound record sheet on a magnetic sound record reading machine. A magnetic sound record sheet has relatively great width and is made of a carrier of material such as paper, plastic or similar other materials and magnetic sound record film coated on the carrier sheet. The magnetic sound record sheet as described above may shrink and elongate in both lateral and longitudinal directions according to the change of temperature and humidity. The sheet has generally setting holes and is placed in a predetermined position on a magnetic sound record reading machine by the engagement of the holes of the sheet with setting pins provided on a panel of a magnetic sound record reading machine. It is apparent that, if the setting pins of the panel of the reading machine are in fixed positions, it is hardly possible to set a magnetic sound record sheet on the panel when the sheet shrinks, and the sheet is placed in slack condition on the panel when it is elongated.

An object of this invention is to provide a method and an apparatus by which a magnetic sound record sheet can be placed on a panel always in stretched condition irrespective whether the sheet is shrunk or elongated.

Another object of this invention is to provide a system in which a magnetic sound record sheet can be conveniently set on a panel of the reading machine, distributing the shrinkage or elongation of the sheet in such a way that no practical difficulty will be caused in recording and reproducing of sound.

Another object of this invention is to provide setting holes in a magnetic sound record sheet which are suitable for distributing the shrinkage and the elongation of the sheet and setting the sheet in a proper position on the magnetic sound record reading machine.

The features and objects as described above as well as other features and objects of this invention will be made clear in the following description with reference to some embodiments of this invention illustrated by accompanying drawings, in which.

Figure 2:
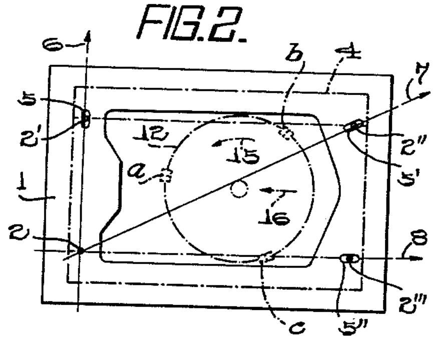
Fig. 2 is a diagrammatic front view of a panel provided with adjustable setting pins of a magnetic sound record reading machine according to this invention, in which a magnetic sound record sheet and a turntable of the reading machine are shown by chain lines.
Figures 3, 4:
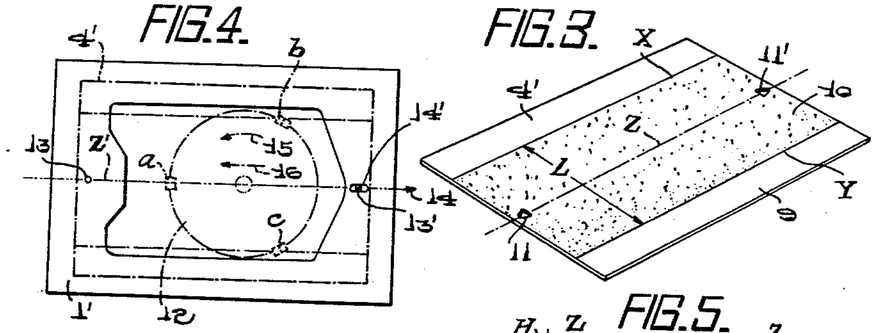
Fig. 3 is a perspective view of a magnetic sound record sheet adapted to distribute the shrinkage and elongation of the sheet in such a way as does not cause practical difficulties in recording and reproduction.
Fig. 4 is a front view of a panel of a magnetic sound record reading machine adapted to set the magnetic sound record sheet as illustrated in Fig. 3.
Figure 5:
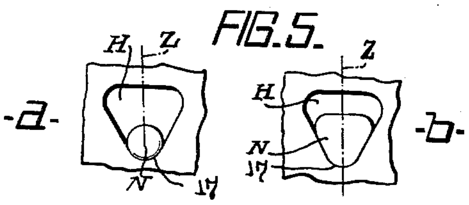
Figure 7:
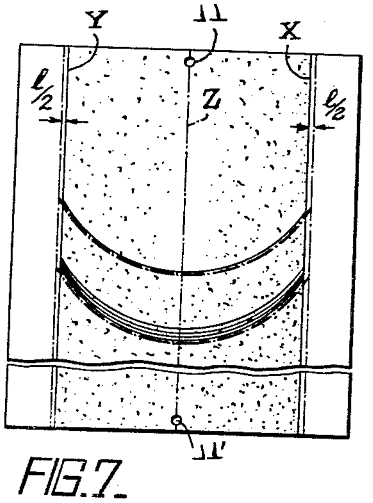
Figure 6:
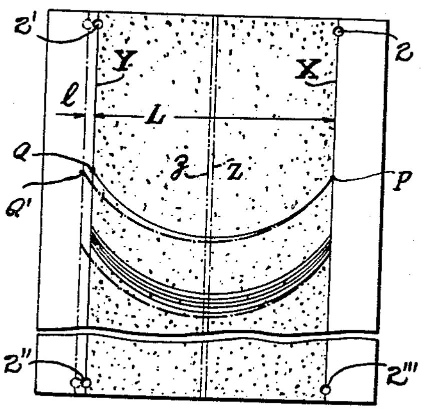
Figures 8, 9, 10, 11, 12:
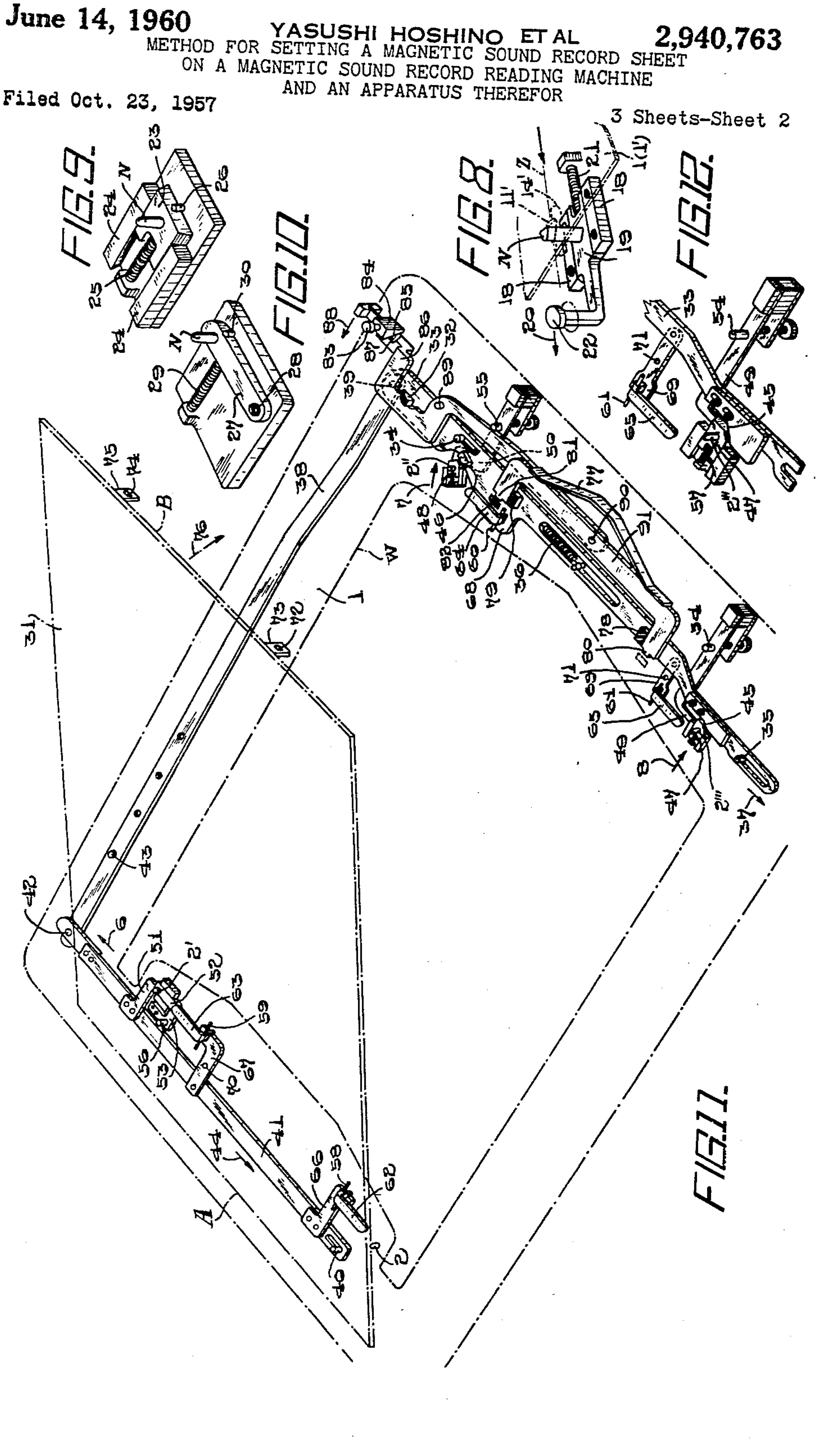
Figures 13, 14, 15:
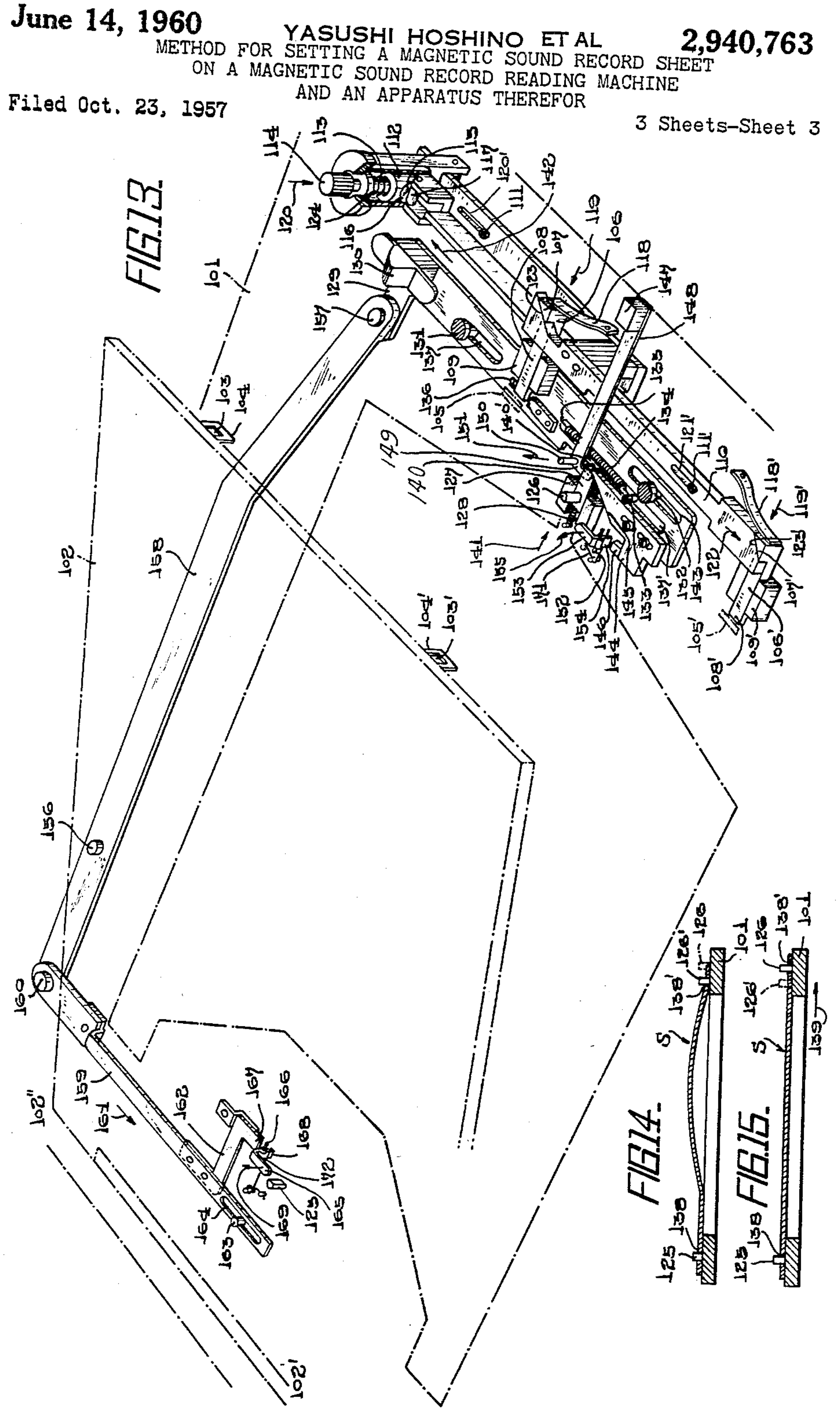

Figs. 5(*a*) and (*b*) are partial front views showing the condition of the engagement between a setting pin of a magnetic sound record reading machine and a setting hole of a magnetic sound record sheet;

Fig. 6 is a front view of a magnetic sound record sheet having four setting holes and placed on a panel of a magnetic sound record reading machine as illustrated in Fig. 2, showing the effect of elongation of a magnetic sound record sheet in the direction of width;

Fig. 7 illustrates a magnetic sound record sheet having two setting holes as illustrated in Fig. 3 and placed on a panel of a magnetic sound record reading machine as illustrated in Fig. 4, showing the distribution of elongation of width on both sides;

Figs. 8, 9 and 10 are devices for changing the position of a setting pin of a magnetic sound record reading machine;

Fig. 11 is a perspective view of an apparatus for setting a magnetic sound record sheet having 4 setting holes on a magnetic sound record reading machine according to the system diagrammatically illustrated in Fig. 2;

Fig. 12 is a partial detailed perspective view of Fig. 11 in a larger scale showing a device for locking a setting pin and a device for disengaging a magnetic sound record sheet from a setting pin;

Fig. 13 is a perspective view of an apparatus for setting a magnetic sound record sheet having two setting holes on a magnetic sound record reading machine according to the system diagrammatically illustrated in Fig. 3;

Fig. 14 is a cross sectional view of a magnetic sound record sheet mounted on a pair of setting pins of a panel when the distance between the pins is shortened by moving one of the pins; and Fig. 15 is a cross sectional view of a magnetic sound record sheet mounted on a pair of setting pins of a panel when the distance between the pins is extended to stretch the sheet by moving one of the pins.

Now the invention will be explained with reference to the accompanying drawings.

Figure 1:
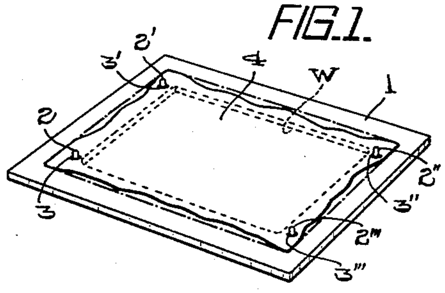
Fig. 1 is a perspective view of a magnetic sound record sheet which has been elongated under the influence of change of temperature and humidity and set on a panel provided with fixed setting pins.

In a magnetic sound record reading machine, it has been general practice to place a magnetic sound record sheet 4 on a panel 1 having a window W of a magnetic sound record reading machine, facing the magnetic sound record film of the magnetic sound record sheet downwardly, by engaging setting holes 3, 3′, 3″, 3‴ of the sheet with the setting pins 2, 2′, 2″, 2‴ fixed on the panel 1 as illustrated in Fig. 1. On the sheet thus set, a transparent pressing plate is placed to keep the sheet tightly in the position, and a turn table provided with sound recording and reproducing heads (*a*) (*b*) (*c*) on the circumference is arranged below the sheet 4 and the turn table is rotated and moved at the same time in the longitudinal direction to scan the sound tracks on the sheet with the sound recording and reproducing heads.

However, the sheet may elongate or shrink according to the change of temperature and humidity. If the sheet shrinks, the distances between the setting holes will be decreased while the distances between settings pins are maintained substantially constant. Under such conditions, it is impossible to effect the engagements of the holes and pins without breaking the magnetic sound record sheet.

On the other hand, when the magnetic sound record sheet is elongated, the distances between the setting holes will become greater than distances between the pins and when the sheet is set on the magnetic sound record reading machine, the sheet will be slackened and take a complicated form as illustrated in Fig. 1. When a pressing plate is placed on such a sheet to press it, there will be wrinkles and furrows on the surface of the sheet and it is evident that it is impossible to obtain satisfactory recording or reproducing of sound with such a sheet.

According to the invention a setting pin 2 is fixed on the panel but another setting pin 2′ (see Fig. 2) is made movable along a guiding means 5 provided in alignment with the line connecting the pins 2 and 2′ and is always pulled in the direction of 6 by a force of proper strength. The third setting pin 2″ is also movable along a guiding means 5′ provided in alignment with a line connecting the pins 2 and 2″ and is pulled in the diagonal direction of arrow 7 by proper force, while the fourth setting pin 2‴ is also movable along a guiding slot 5″ and is always pulled in the direction of arrow 8.

When the magnetic sound record sheet 4 is set on the panel 1 by means of setting pins 2′, 2″, 2‴ movable as explained above together with a fixed pin 2, the magnetic sound record sheet 4 is pulled in the direction of arrow 6 by the setting pin 2′, in the direction of arrow 8 by the setting pin 2‴ and in the diagonal direction of arrow 7 by the setting pin 2″, from the fixed pin 2. Accordingly the magnetic sound record sheet 4 will be always fixed in stretched condition on the panel 1 even if there is some elongation or shrinkage in the sheet.

Fig. 3 illustrates a sheet generally similar to the sheet 4 and comprising a carrier 9 and a magnetic sound record film 10 between parallel demarcating lines X and Y, but having only two setting holes 11, 11′. The back surface of the sheet has visual descriptions such as letters, drawings and the like, a space for descriptions. The setting holes 11, 11′ are formed in the central line Z between the parallel demaracation lines X and Y. The panel 1′ on which the sheet is mounted has two setting pins, (see Fig. 4) the one 13 fixed on the panel and the other 13′ movable along a guiding means 14′ provided in the position coinciding with the central line Z′ and always being urged in the direction of arrow 14.

When the magnetic sound record sheet 4 or 4′ is placed by the setting means as illustrated in Fig. 2 or Fig. 4 on the panel 1 or 1′ of a magnetic sound record reading machine and pressed by a pressing plate from the top, and then sound recording and reproducing heads (a)(b)(c) provided on the circumference of a turn table at equal linear intervals as the width L of the magnetic sound record film of the sheet are brought in contact with the magnetic sound record film one by one by rotating the turn table in the direction of arrow 15 at the same time in the longitudinal direction of 16 to scan the sound tracks of the sheet 4, sound recording or reproducing can be effected while the operator is reading or observing the description on the front surface of the sheet through the transparent pressing plate.

However, when the sheet is elongated, for example, in the direction of the width by the length of ($l$) as shown in Fig. 6, the central line Z of the sheet will be removed to $z$ when one side 2—2‴ of the sheet is fixed. Generally the length ($l$) is short, and the effect of the elongation is not so great as it will hinder practically the recording or reproducing of sound. But since the center line of the turning table 12 is still in the line of Z, there will be a slight discrepancy between the sound track PQ′ on the sheet and the scanning path PQ of the sound reproducing head on the turning table 12. Accordingly although the reproduction is the beginning part near P, where the discrepancy between the sound track and the scanning path is negligible is satisfactory, the reproduction in the ending part Q, Q′ will be affected substantially due to a relatively great discrepancy between the sound track and the scanning path. When the gap of the reproducing head is short, this difficulty is so serious that the head is gradually moved away the central part of the sound track to decrease the intensity of sound and at last entirely driven out of the sound track to interrupt the reproduction. Accordingly satisfactory reproduction of sound cannot be attained when the amount of elongation is substantial. Moreover, if the distance between the adjoining tracks is short, the reproducing head may be removed to the neighbouring track to cause confusion of reproduction.

As to the elongation in the longitudinal direction, the adjustment of the position of the turn table is easy since when the head on the turn table is out of a sound track, it can be easily brought on a sound track by moving manually the turn table or the sheet to place the head on the sound track and such an adjustment can be easily accomplished by a simple mechanism and operation. For example, the sheet can be stretched longitudinally by means of devices as illustrated in Fig. 8, 9 and 10 which will be explained later and the starting point of the turn table in the longitudinal direction can be changed easily by moving the turn table by hand. The elongation in the longitudinal direction may be great when the sheet is considered as a whole, but the longitudinal elongation in respect of each sound track is negligible since it is in fact the elongation of the width of a sound track which is very small.

However, the adjustment for the elongation or shrinkage in the direction of width is not so easy and tends to cause serious difficulties as explained above.

In the setting according to the system of Fig. 4, the central line Z of the sheet and the center of the turn table are always kept in the same vertical plane and the elongation ($l$) in the width of the sheet is distributed on both sides of the central line Z to be $l/2$ each on both sides. Under this condition, the half tracks on both sides would be substantially similar arc sections of a circle to each other (strictly speaking, they are sections of a cycloid since the turn table moves longitudinally while rotating), and they may be satisfactorily scanned by the reproducing head on the turn table since the discrepancy between the sound track and the scanning path of the reproducing head is relatively small, if any. When this setting system is used, it is preferable as shown in Figs. 5(a) and (b), to form the setting hole H of the sheet in a triangular shape having substantially wider area than the cross section of the setting pin N on the panel of the magnetic sound record reading machine, section of the pin N being also made a triangular form corresponding to the form of the angle part 17 of the hole H of the sheet. In order to eliminate any chance of breaking the angle part 17 of the hole, it is preferable to give some roundness to this part and further to strengthen the part by affixed a reinforcement of a proper material such as paper, cloth, metallic foil, resin or the like by pasting, coating or any other means conventionally used in the art for such a purpose.

According to the system as illustrated in Fig. 4, a magnetic sound record sheet is set on a panel by means of two pins 13, 13′ and the distance between the two pins is adjustable according to the change of the length of the sheet.

For this purpose, one of the pins 13 is fixed on the panel and the other pin 13′ is pulled outwardly along the center line of the sheet by a device as explained later and therefore the sheet will be stretched in the longitudinal direction. It will be evident that if the pins 13, 13′ are placed in the center line of the sheet and the movable pin 13′ is movable along said center line, while the turn table is moved along the same center line, the center of the turn table is always in the line on a same vertical plane including the center line of the sheet. When the hole H of the sheet and the section of the setting pin N are formed in the shape as shown in Fig. 5(b), and the sheet is stretched in the direction downwardly, the center line Z of the sheet is maintained always in the same line since the needle is movable only in the center line which is also the direction of the longitudinal movement of the turn table.

When the mounting or dismounting of the sheet is desired, the setting pin N is moved a little in the direction to the center of the sheet. Then the engagement between the setting pin N and the setting hole H of the sheet will become loose since the area of the hole is larger than the sectional area of the pin, and mounting or dismounting of the sheet can be carried out very easily with no risk of breaking the sheet. Now a device for moving a setting pin for the purpose of stretching a magnetic sound record sheet on a panel of a magnetic sound record sheet reading machine will be explained.

Fig. 8 illustrates a stretching device for a magnetic sound record sheet which is operated manually. On a panel plate 1 is formed a guiding slot 14' which allows the sliding of a setting pin in the direction of central line Z of a magnetic sound record sheet. The setting pin N is fixed on a sliding member 19 slidable along dovetail grooves 18, 18 formed in an attachment member fixed on the back surface of the panel plate 1 of a magnetic sound record reading machine.

The sliding member 19 is always pushed in the direction of arrow 20 by means of a spring 21 to stretch the sheet by the setting pin N fixed on the sliding member 19. When it is desired to mount or dismount the sheet, the handle 22 is pushed in the opposite direction to arrow 20 against the force of the spring 21 to move the setting pin N. Since the setting hole of the sheet is made sufficiently larger than the sectional area of the setting pin N, the engagement between the hole and the pin will become loose when the pin is moved inwardly, and thus the sheet will be able to be removed from the pin easily with no fear of damaging the sheet.

The device for moving a setting pin illustrated in Fig. 9 is similar to that of Fig. 8. In the embodiment of Fig. 9, a setting pin N is fixed on a sliding piece 23 which is slidable under the guidance of dovetail grooves 24, 24 and is pushed by a spring 25. The range of the movement of the sliding member is limited by a stopper 26.

Fig. 10 illustrates a device slightly different from those of Figs. 8 and 9. A lever 27 pivoted at 28 is used as a member carrying a setting pin N in place of a sliding member. The lever 27 is pushed by a spring 29 to rotate around the pivot 28 thereby moving the setting pin N outwardly. The movement of the setting pin is not straight but in an arc. However, the movement of the needle may be considered straight for practical purpose since the amount of movement is relatively small in comparison with the length of the lever 27 which is made substantially long. By the devices as described above, the setting pins N can be moved inwardly and outwardly. When it is desired to mount or dismount the sheet, the needles may be moved to their inward positions by manual operations. However, such an operation is troublesome, and therefore it is desirable to attain such operations automatically. Accordingly, an apparatus as illustrated in Fig. 11 is provided in accordance with the invention which can operate to move a number of setting pins automatically at the same time. The apparatus of Fig. 11 is used in conjunction with the system as shown in Fig. 2.

In Fig. 11, 1 represents a panel and 31 a pressing plate. On the back surface of the panel 1 a long metallic member 33 is slidably mounted along one side to be guided by guiding pins 34, 35 fixed on the panel 1, which guiding pins being in engagement with the slots of said metallic member. This metallic member 33 is always pulled in the direction of 37 by means of a spring 36. At one end of the metallic member 33 is pivoted at 39 a metallic link 38 which is pivoted on the panel 1 at 43 and extends along another side of the panel. On the other end of the link 38 is pivoted at 42 another long metallic member 41 to extend along the side of the panel opposite to the first metallic member 33. The metallic member 41 is guided by a pin 40 fixed on the panel and is in engagement of a slot of the metallic member 41 and hence it is slidable. A button 32 is fixed on the first metallic member 33 which may be moved in the direction opposite to the direction of arrow 37. When the member 33 is moved, the link 38 will be rotated around the pivot 43 to move the metallic member 41 in the direction of arrow 44. On the panel 1 are mounted devices for moving setting pins as explained with reference to Figs. 8, 9 or 10. The attachment members of these devices are fixed on the panel in proper positions near the corners of the panel and the setting pins are allowed to move inwardly and outwardly. In Fig. 11, 2, 2', 22'' and 2''' are setting pins (corresponding to N in Figs. 8, 9 and 10) while 48, 47 and 52 are sliding members supporting pins 2'', 2''' and 2' respectively (corresponding to 23 in Fig. 9). The setting pin 2 is a fixed pin and has no means for moving said pin. The long metallic member 33 has an inclined surface 45 adapted to engage with the sliding member 47 and another inclined surface 46 adapted to engage with the sliding member 48. When the metallic member 33 is moved in the direction opposite to 37, the sliding member 47 and 46 will be moved in the directions opposite to 8 and 7 respectively against springs urging the sliding members in the direction 8 or 7. When the sliding member is moved to a proper position, it is desirable to keep the sliding member in this position. For this purpose, a locking device comprising an elastic plate is provided. Since the locking device is similar for all the setting pins, the locking device will be explained only in respect of the pin 2'''. The elastic plate 49 is in slidable engagement with the lower surface of the sliding member 47, and when the sliding member is moved inwardly to reach a definite inward position, the end of the elastic plate comes into engagement with a groove of the sliding member 47 to lock said member together with the setting pin 2''' fixed thereon in said position. When the setting pin is brought in the inward position as described above, the long metallic member 33 is allowed to return to the original position by the action of the spring 36 by releasing the operation button 32. When the button 32 is released from the operation, the metallic member 33 is moved in the direction of arrow 37, but the inclined surfaces 45 of the metallic member does not act to move the sliding member 47 and the sliding member is maintained in the locked position by the locking of the elastic member 49. It will be understood that the setting pin 2'' can be moved by the inclined surface 46 of the metallic member 33 and is locked by the elastic member 50 when the metallic member 33 is operated as mentioned above, and further that the movable pin 2' can also be moved and locked in an inward position by means of a similar device on the side of the metallic member 41 and an elastic member 53 adapted to lock a sliding member 52 when the metallic member 41 is moved simultaneously according to the movement of the metallic member 33 through the link 38. Now all the movable pins 2', 2'' and 2''' are fixed in their respective inward positions, and therefore it will be easy to mount a sheet by engaging the setting holes of the sheet with the setting pins of a magnetic sound record reading machine. In this condition, the sheet will be slackened to some extent. After mounting a sheet, a button 54 on the elastic plate 49 is pressed to release the sliding member 47 from the locking and the sliding member 47 is moved outwardly by the action of the spring 57 to stretch the sheet. Similarly the button 55 on the elastic member 50 for the pin 2'' and the button 56 on the elastic member 53 for the pin 2' are pushed down to move the pins 2'' and 2' outwardly to stretch the sheet. Of course, the stretch forces must not be too great lest the breaking of the sheet should occur, but the stretching forces can be easily adjusted by using proper springs in the devices for moving the pins. Now the sheet is properly mounted on the panel in expanded condition, and the pressing plate 31 is to be placed on the expanded sheet.

The pressing plate 31 is hinged on one side A on the panel 1 and has locking means on the opposite side B. The locking means of the pressing plate comprises engagement pieces 73, 75 having a hole 72, 74 respectively.

On the lower surface of the panel 1 is mounted a locking member 91 which is slidable along guiding pieces 78 and 79 and pressed by a plate spring 77. The locking member 91 has at ends hooks 80 and 88 adapted to engage with the holes 72 and 74 of the engagement pieces 73 and 75 of the pressing plate 31. The engagement pieces 73 and 75 are long enough to pass through holes provided in the panel 1 and also in the metallic member 33, and the locking between the panel 1 and the pressing plate 31 by the hooks 80, 81 as described above is effected below the panel and the metallic member 33.

Now the metallic member 33 is secured in a definite position by the engagement of the locking piece of the pressing plate 31 passing through the hole provided in the metallic member 33 and the button 32 is no longer operable. Thus the sheet will be maintained in a definite position in stretched condition for recording or reproducing of sound.

When it is desired to remove the sheet from the panel, firstly the locking member 91 is moved to the left by means of a button 83 in the upper right corner of the panel to release the pressing plate 31 from the locking by the hooks 80 and 81 and the pressing plate 31.

For this purpose, the button 83 is movably mounted on the panel 1 and is urged upwardly by a spring. On the lower end of the button 83 is provided a metallic piece 84 having an inclined surface 85 adapted to engage with the inclined surface 87 at the end of a metallic lever 86 pivoted at 89 on the panel 1, and hinged with the locking member 91 at 90. When the button 83 is pressed down, the lever 86 is rotated around the pivot 89 and the locking member 91 will be moved to the right to release the pressing plate 31 from the locking by the hooks 80 and 81. After raising the pressing plate 31, the button 32 now is operated to move the metallic member 33 in the direction opposite to arrow 37 as explained before. Now the distances between the setting pins 2, 2′, 2″, 2‴ are decreased and the engagement between the holes of the sheet and the setting pins are loose, and hence the removal of the sheet can be effected easily. In this operation, if there is provided a device which lifts the sheet when the sheet is brought into slackened condition and is ready for dismounting by moving the setting pins inwardly, it will be convenient. Accordingly, there are provided on the panel 1 of the magnetic sound record reading machine lifting pieces 62, 63, 64 and 65. These pieces are of L shape and one arm of the piece is placed on the level of the upper surface of the panel 1 while the other arm is suspended downwardly. The lifting piece is rotatable around a pin provided in the panel and the mechanism for rotating the piece is almost similar in respect of all the four pieces, and therefore a detailed explanation will be made only with reference to the lifting piece 65. The piece 65 is rotatable around a pin 61 (see Fig. 12) provided in the panel 1 and the suspended leg of the piece is in engagement with the end of a lever 69 pivoted at 71 on the panel and hinged on the metallic member 33. When the metallic member 33 is moved in the direction opposite to the direction of arrow 37, the lever 69 is rotated around the pivot 71 and the horizontal of the L shape will be rotated to rise since the leg of said lifting piece is moved by the end of the lever 69. It is to be noted that when a sheet is mounted, the metallic member 33 is returned to the original position by the action of the spring 36 although the setting pin 2‴ is in the inward position, and hence the lifting piece is returned in the horizontal position not to hinder the operation of mounting a sheet. It will be needless to say that since the directions of the movements of the metallic members 33 and 41 are different from each other, the position of the hinge fixing the lever on the metallic member must be varied in relation to the position of the axis of the rotation of the lifting piece.

When an apparatus as illustrated in Fig. 11 is used, the mounting and dismounting of a sheet can be easily effected since the change of the positions of a number of setting pins can be automatically and simultaneously effected by the operation of a single button and the sheet is lifted automatically in dismounting.

Fig. 13 illustrates an apparatus which is similar to the apparatus as explained with reference to Fig. 11 but is adapted to use for a system as illustrated in Fig. 4, in other words, an apparatus for setting a magnetic sound record sheet having two setting holes on a panel having two setting pins of a magnetic sound recording machine.

In the drawing, a transparent pressing plate 102 and a panel 101 of a magnetic sound record reading machine are shown by broken chain lines respectively. The pressing plate 101 is hinged at 102′, 102″ on the panel on one end and has locking pieces 104, 104′ provided with rectangular holes 103, 103′ on the opposite end.

When the pressing plate 102 is lowered on the panel, the locking pieces 103, 103′ pass through the holes 105, 105′ provided in the panel 101 and are locked by engagement between the holes 103, 103′ of the locking pieces 104, 104′ and the hook ends 108, 108′ provided at the ends of locking members 106, 106′ which are guided by guides 109, 109 and 109′, 109′ respectively and always pushed in the directions of 119 and 119′ by springs 118 and 118′ respectively.

When it is desired to open the pressing plate 102, a metallic bar 110, which is guided by studs 111, 111′ fixed on the panel 101 through slots 120′, 121′ provided in the bar, is moved in the direction of arrow 122 by means of a button 114 which projects through the panel 101. The metallic bar 110 has inclined surfaces 123, 123′ on the side and pushes the locking members 106, 106′ in the directions opposite to the directions of 119, 119′ against the springs 118, 118′ when it is moved as described above. Thus the lockings between the locking pieces 104, 104′ and the locking members 106, 106′ are released and the pressing plate 102 may be raised.

The movement of the metallic bar 110 as described above can be effected by simply fixing the button 114 on the bar and moving the button. However, it will be convenient to provide a means as illustrated in the drawing. In the embodiment of the drawing, the button 114 is connected with a block 112 by a rod 124 and is urged upwardly by a spring 113. The block 112 has an inclined surface 116 and a small roller 115 rotatably mounted on said surface.

When the button 114 is pushed downwardly, namely in the direction of arrow 120, the roller 115 comes into contact with an inclined surface 117 of the metallic bar 110 and pushes the metallic bar to slide in the direction of arrow 122.

Now the apparatus for setting a magnetic sound record sheet (S) on a panel of a magnetic sound record reading machine will be explained. The panel 101 is provided with two setting pins 125 and 126 in the central longitudinal line of the panel along which a turn table (not shown) moves while rotating. A magnetic sound record sheet (S) has two setting holes 138, 138′ in the central longitudinal line and the holes are to be set on the setting pins 125, 126. When the sheet is to be placed on the panel, it will be easier to have the distance between the two setting pins 125, 126 shorter than the distance between the setting holes 138, 138′ as shown in Fig. 14. However, under such a condition, the sheet is slackened and no good result can be attained in recording and reproducing of sound. Accordingly it will be necessary to expand the sheet in stretched condition as illustrated in Fig. 15. For this purpose, one of the setting pins 125 is fixed on the panel and the other setting pin 126 is mounted slidably along the central longitudinal line of the panel 101.

The setting holes of the sheet S and the section of the setting pin are made triangular form as stated before with reference to Fig. 5. Since the setting pin 126 is movable, the sheet S can be always stretched irrespective of the amount of shrinkage or elongation of the sheet.

In the embodiment of Fig. 13, the movable setting pin 126 is fixed on a sliding member 140 which is guided by guides 127, 127 and pushed by a spring 128 in the direction of arrow 141, the direction being in accord with the longitudinal line of the panel 101 and the longitudinal line of the movement of the turn table of the magnetic sound record reading machine.

When it is desired to mount a sheet S on the panel 101, a knob 130 projecting from the surface of the panel 101 is pulled in the direction of arrow 142 to move a metallic number 129 connected with the knob 130 under guidance of guiding studs 131, 132 fixed on the panel and in engagement with the slots 137, 143 of the metallic member 129. (The metallic member 129 is always pulled in the direction opposite to the direction of arrow 142 by a spring 134 one end of which is fixed on a stud 133 on the panel 101.)

An inclined surface 145 of a piece 144 integral with the metallic member 129 pushes the sliding member 140 on which the pin 126 is fixed in the direction opposite to arrow 141. When the sliding member 140 proceeds, the end 149 of a locking member 148 which is an elastic metallic piece tending to rise upwardly at one end comes into engagement with a locking device 140' provided on the front surface of the sliding member and the sliding member 140 is fixed in a determined position which locates the setting pin 126 in the position as illustrated in Fig. 14 by 126'. In the drawing, 147 is a clamping element which fixes the elastic locking member 148 on the panel 101. Now the preparation for mounting a sheet S is made and the knob 130 is released. The metallic member 129 is returned to the original position by the action of the spring 134, but the pin 126 is maintained in the shifted position since the sliding member 140 is locked by the end 149 of the elastic locking member 148.

After placing a sheet as shown in Fig. 14, a button 150 projecting above the panel is pushed downwardly, namely in the direction opposite to the direction of arrow 151 to disengage the end 149 of the elastic locking member 148 from the engagement with a locking device 140' on the sliding member 140 to release the sliding member.

When emancipated from the locking, the sliding member 140 is moved in the direction opposite to the direction of arrow 141 under the action of the spring 128 together with the pin 126 fixed on the sliding member 140.

Thus the sheet S is stretched on the panel 101. The position of the setting pin 126 may be different according to the amount of shrinkage or elongation of the sheet, but the sheet S will always be stretched on the panel 101 in optimum condition. Now the pressing plate 102 will be lowered and the pressing plate 102 is locked with the panel 101 as already explained.

When it is desired to dismount the sheet S from the panel 101, the pressing plate 102 is unlocked by the operation of the button 114 as already explained and the pressing plate 102 is raised. Then the metallic member 129 is moved by pulling the knob in the direction of arrow 142. The setting pin 126 will be moved in the direction opposite to the direction of arrow 142 to place the setting pin in a definite position as shown in Fig. 14 by the mechanism as already explained.

In this position dismounting of the sheet for the setting pins can be carried out easily. According to this invention, a device for automatically dismounting the sheet S from the setting pins is further provided to facilitate the dismounting operation. According to the embodiment of Fig. 13, a lifting lever 153 is provided on the panel 101 and is arranged to be rotated around a hinge 152 provided in the surface of the panel when the metallic member 129 is pulled in the direction opposite to the direction of arrow 142 by a projection 146 of the metallic piece 144 which moves together with the metallic member 129 and comes into engagement with the leg 154 of the lever 153 to raise the end of the lever 153 above the level of the setting pin 126 to disengage the sheet S from the setting pin 126. On one end of the metallic member 129 is pivoted at 157 one end of a link 158 which is pivoted at 156 on the panel 101 and has another end hinged at 160 with the end of another metallic member 159. When the knob 130 is moved in the direction of arrow 142 the link 158 is rotated around the pivot 156 and the metallic member 159 is moved in the direction of arrow 161 under the guidance of a stud 163 which is in engagement with a slot provided in the metallic member 159. A metallic piece 162 is fixed on the metallic member 159 and comes into contact with the leg 168 of a lifting lever 165 hinged on the panel by a pin 166 to push the leg 168. Accordingly the end of the lever 165 is raised in the direction of arrow 169 and the sheet is dismounted from the setting pin 125. It is preferable to provide springs 171 and 172 for maintaining the lifting levers 153 and 165 to keep always the levers on the surface of the panel in horizontal condition unless they are rotated by the projection 146 movable together with the metallic member 129 and the metallic piece 162 fixed on the metallic member 159.

It will be clear from the above descriptions that the preparation of mounting the sheet can be effected by pulling a knob 130 in the direction of arrow 142 until the sliding member 140 is locked by the engagement with the end 149 of the elastic member 148 and releasing the knob 130.

In this operation, the lifting levers 153, 165 are raised once but are returned to the original position since the metallic members 129 and 159 are returned to the original position when the knob 130 is released.

After engaging the setting holes of the sheet on the setting pins 125 and 126, the button 150 is pressed downwardly to release the locking of the sliding member 140 from the engagement of the elastic locking member 148, and then the button 150 is released. The pin 126 is moved in the direction of arrow 141 to stretch the sheet.

For dismounting the sheet, the knob 130 is pulled in the direction of arrow 130 to move the setting pin 126 in the direction opposite to the direction of arrow 141, namely in the position of 126' in Fig. 14. During this operation, the lifting levers 153, 165 are raised to dismount the sheet from the engagement of setting pins 125, 126.

This operation brings the setting pin 126 in the position as shown in Fig. 14, and therefore the apparatus is ready for receiving a new sheet to be operated.

As stated already, when the pressing plate 102 is lowered, the locking piece 103, 103' of the pressing plate 102 pass through the holes 105, 105' of the panel 101. It is arranged in a preferred embodiment to have at least one of the locking pieces 103, 103', for example 103, pass through a slot 136 provided in the metallic member 129 as well. If, after lowering the pressing plate 102 on a sheet, the knob 130 is operated, it may cause breaking of setting holes of the sheet, but when the metallic member is in engagement with the locking piece of the pressing plate 102, there will be no chance of the knob being operated after placing the pressing plate 102 on the sheet.

While the invention is explained with reference to some preferred embodiments of the invention, it will be apparent to those experienced in the art that it is possible to make various modifications and alterations within the spirit and the scope of this invention, and therefore it is to be understood that this invention is not limited to those illustrated in the drawings and explained in the above and limited only by claims.

What is claimed is:

1. A setting system for setting a magnetic sound record sheet, having a description on a front surface and a magnetic sound record film on a back surface, in a magnetic sound recording and reading machine, said system comprising a panel plate defining a window, the magnetic sound record sheet being mounted flatly against the panel plate with the magnetic sound record film downward to expose the film through said window, the panel plate having a longitudinal center line, a turn table below the panel plate and defining an axis of rotation, means for shifting the turn table along the longitudinal center line of the panel plate and adjacent the window, a plurality of transducer heads on the turn table to scan said film; a plurality of setting pins at least one of which is fixed and including at least one other pin which is movable on the panel plate, the pins being adapted for engaging the sheet, first means for normally urging the movable pin away from the fixed pin to stretch the sheet, second means for moving the movable pin towards the fixed pin to a mounting and dismounting position to facilitate mounting and dismounting of the sheet, means for fixing the movable pin in the latter said position, and a transparent pressing plate to press the extended sheet against the plate and to allow observation of said description.

2. A setting system according to claim 1, wherein the two setting pins are on the panel plate along the longitudinal center line of the latter and wherein the movable pin is normally urged along the longitudinal center line of the panel plate, said first means including a spring engaging the movable pin to stretch the sheet and permitting the movable pin to be moved toward the fixed pin for mounting and dismounting the sheet.

3. A setting system according to claim 1, comprising a plurality of movable pins on the panel plate of a magnetic sound record reading machine, said second means including a link system comprising elements operatively associated with the movable pins for moving the same.

4. A setting system according to claim 1, wherein the means for fixing the movable pin comprises a sliding member on which said pin is fixed and an elastic member fixed on the panel plate and adapted to engage the sliding member, with said sliding member moved to bring the pin fixed thereon to a predetermined position.

5. A setting system according to claim 1, further comprising a device for facilitating dismounting of a sheet from the panel plate, said device comprising L-shaped elements rotatably hinged by each of the setting pins and each having an upright leg suspended downwardly from the panel plate and a bottom horizontal arm at the level of the panel plate, and an element for engaging the leg to pivot the horizontal arm to raise the sheet when the movable pin is moved toward the fixed pin.

References Cited in the file of this patent

FOREIGN PATENTS 745,218 Great Britain ---------- Feb. 22, 1956